(12) United States Patent
Adams, Jr. et al.

(10) Patent No.: US 6,181,816 B1
(45) Date of Patent: Jan. 30, 2001

(54) PROCESSING OF PIXEL-BASED IMAGES FOR USE IN PATTERNED SUBSTRATES

(75) Inventors: Louis William Adams, Jr., Inman; Steven Wayne Cox, Chesnee, both of SC (US)

(73) Assignee: Milliken & Company, Spartanburg, SC (US)

(*) Notice: Under 35 U.S.C. 154(b), the term of this patent shall be extended for 0 days.

(21) Appl. No.: 08/996,061

(22) Filed: Dec. 29, 1997

(51) Int. Cl.[7] ............................................. G06K 9/00
(52) U.S. Cl. ............................ 382/162; 382/276; 382/111
(58) Field of Search ................................. 382/162, 165, 382/276, 111

(56) References Cited

U.S. PATENT DOCUMENTS 5,544,256 * 8/1996 Brecher et al. .................. 382/149
5,774,177 * 6/1998 Lane ..................................... 382/111

* cited by examiner

Primary Examiner—Phuoc Tran
(74) Attorney, Agent, or Firm—Terry T. Moyer; George M. Fisher

(57) ABSTRACT

This invention relates to an image processing method whereby large scale patterning artifacts in a pattern comprised of a large number of pattern repeats can be detected by processing a single pattern repeat and, if desired, the method can be used to modify the pattern repeat to render such artifacts less visually obtrusive.

17 Claims, 11 Drawing Sheets

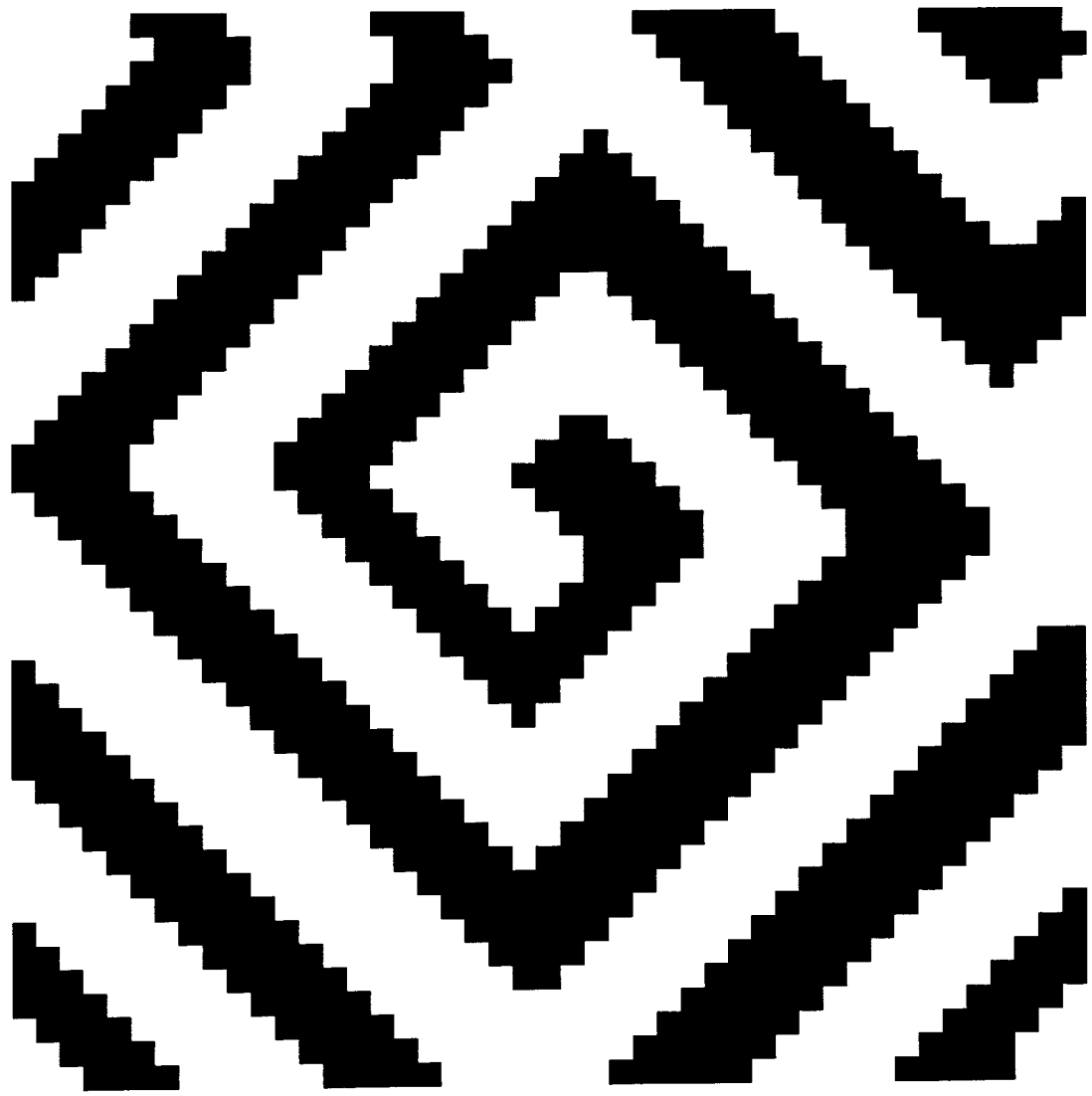
FIG. -1-

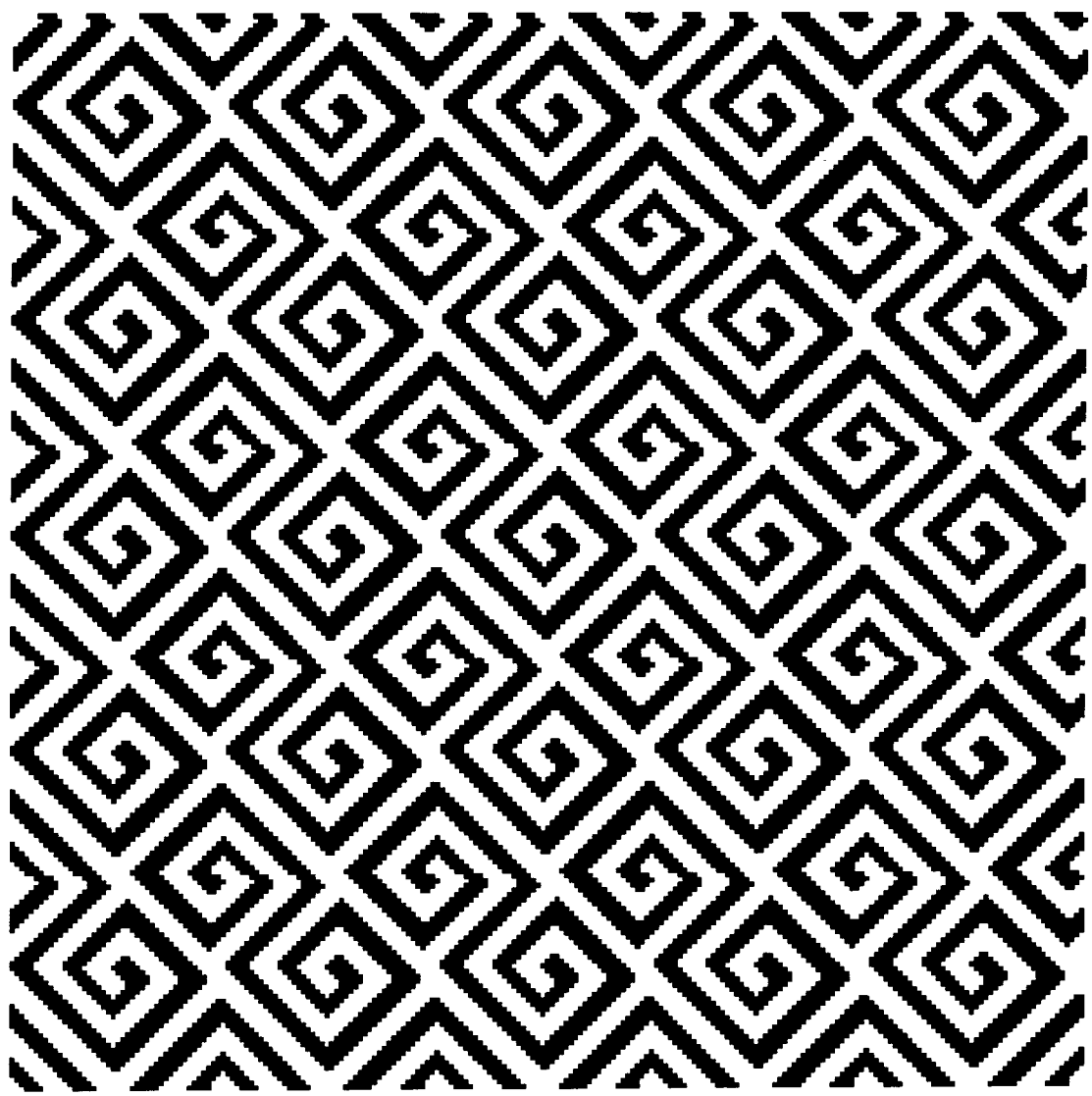
*FIG. -2-*

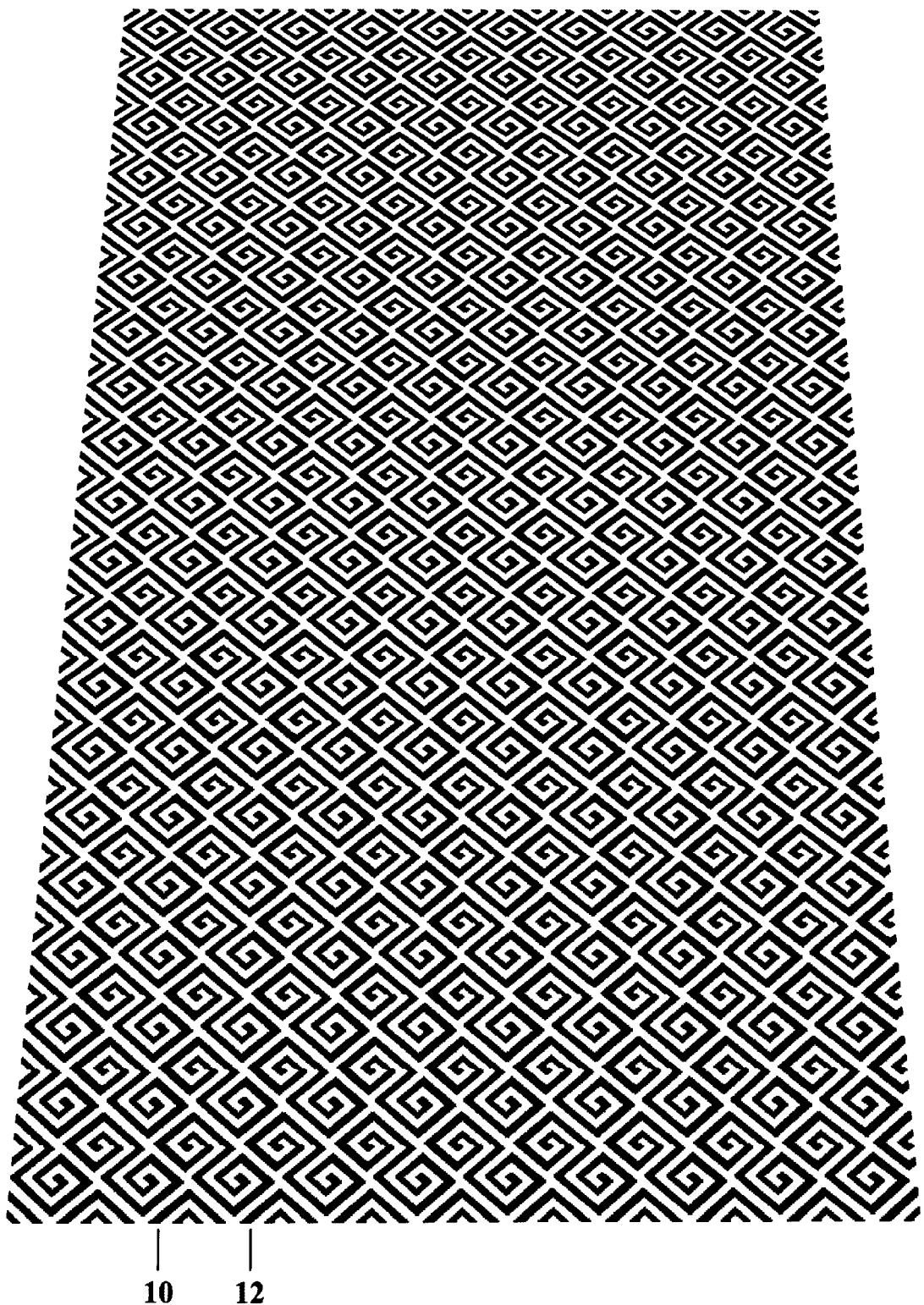
*FIG. -3-*

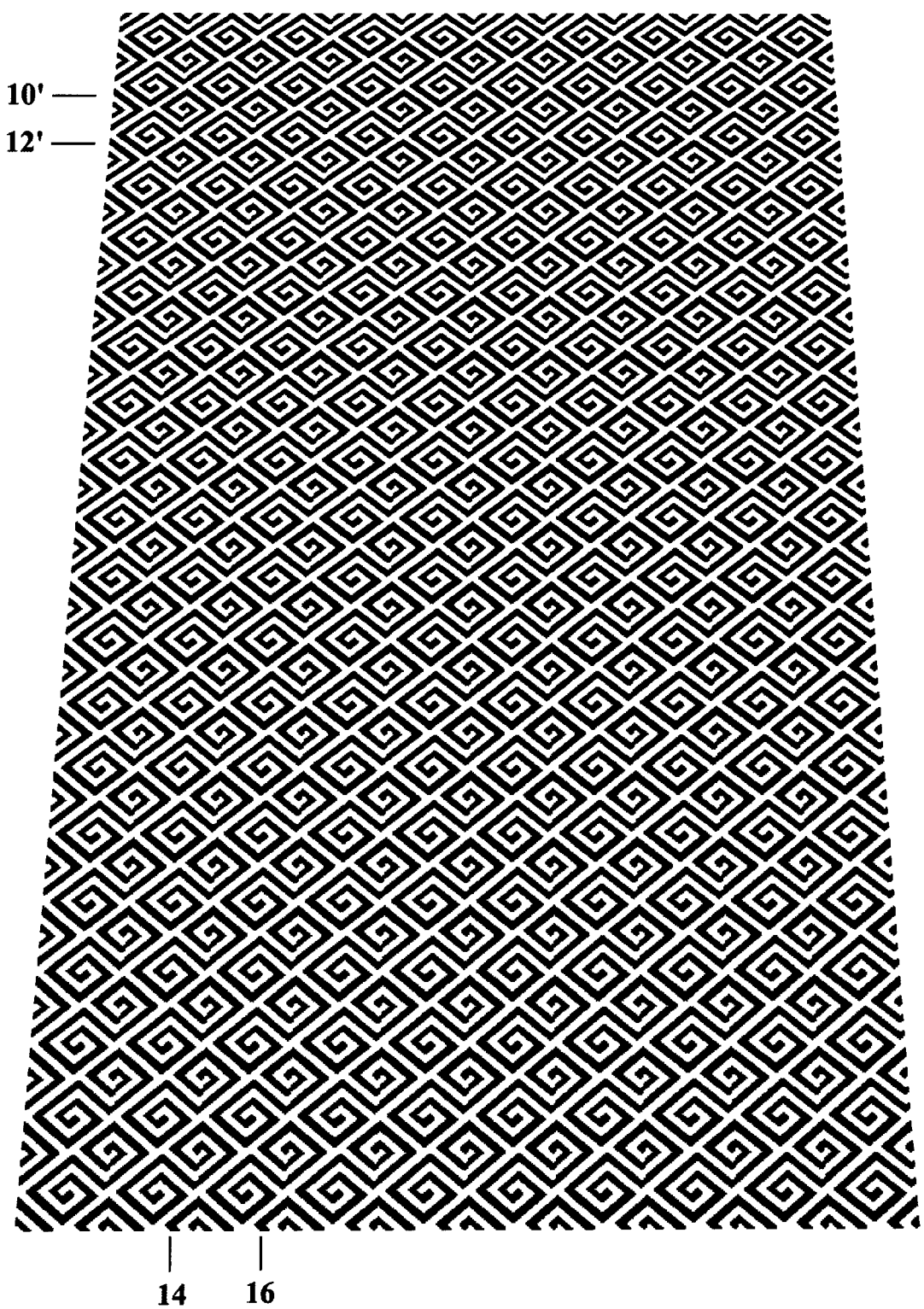
FIG. -4-

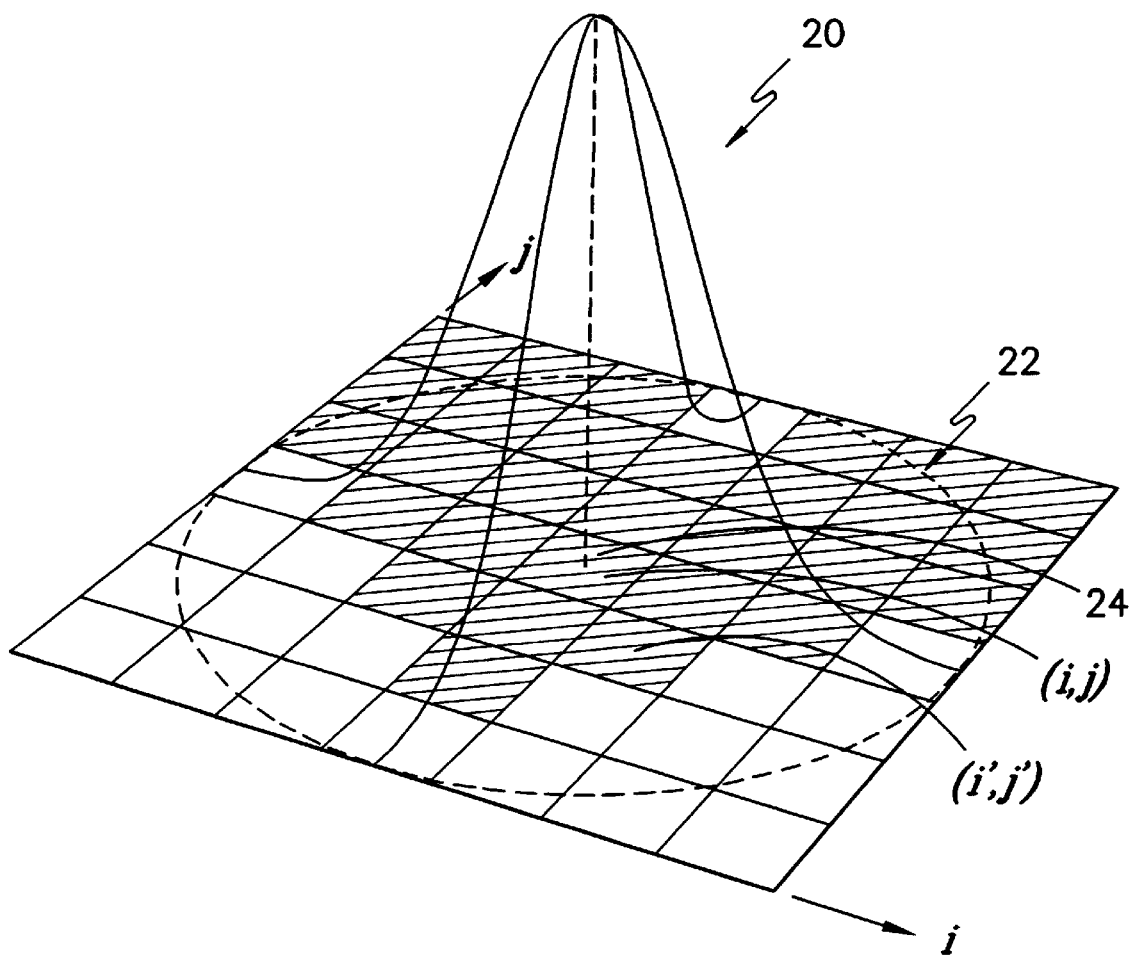
FIG. -5-

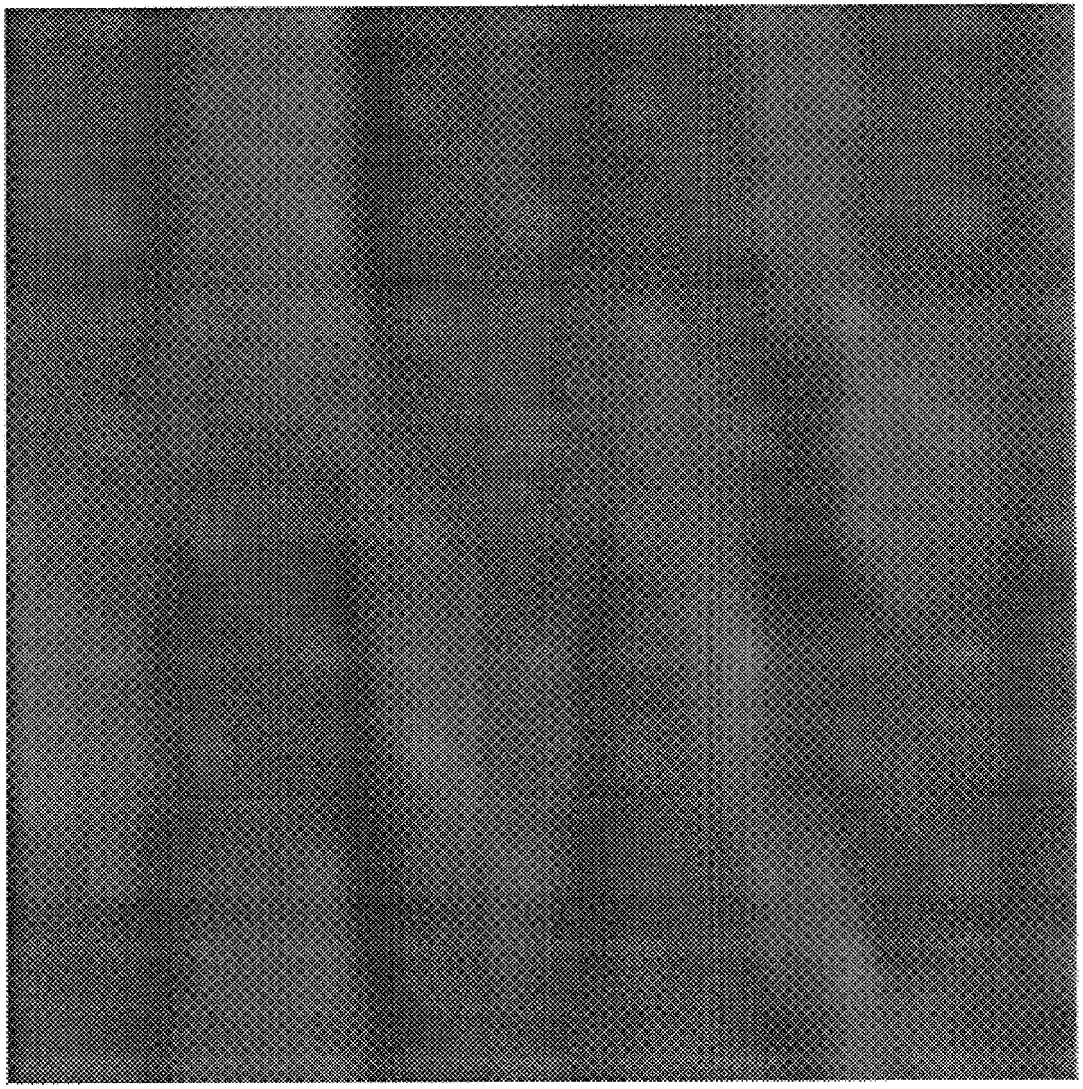
FIG. -6-

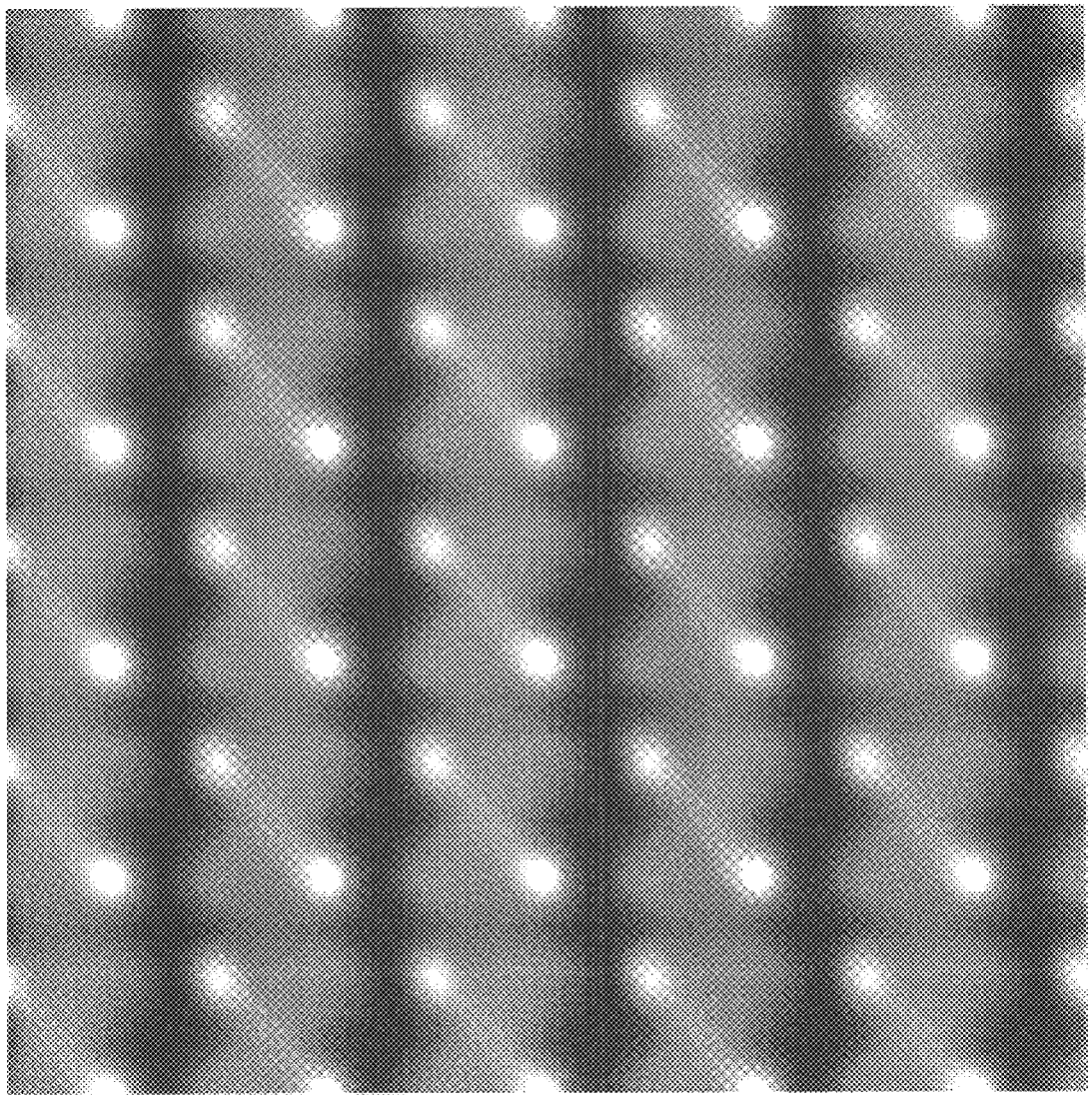
FIG. -7-

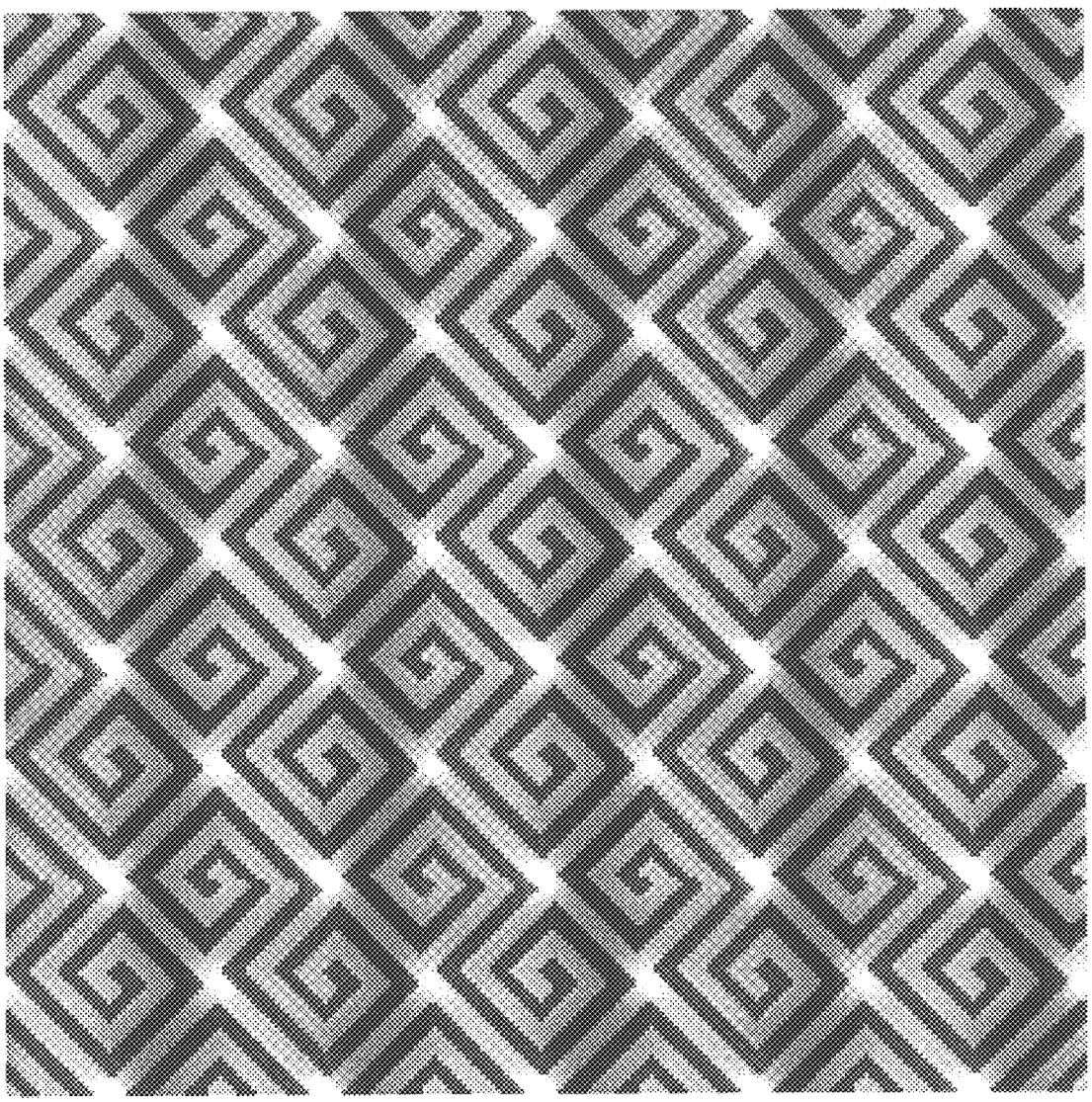
FIG. -8-

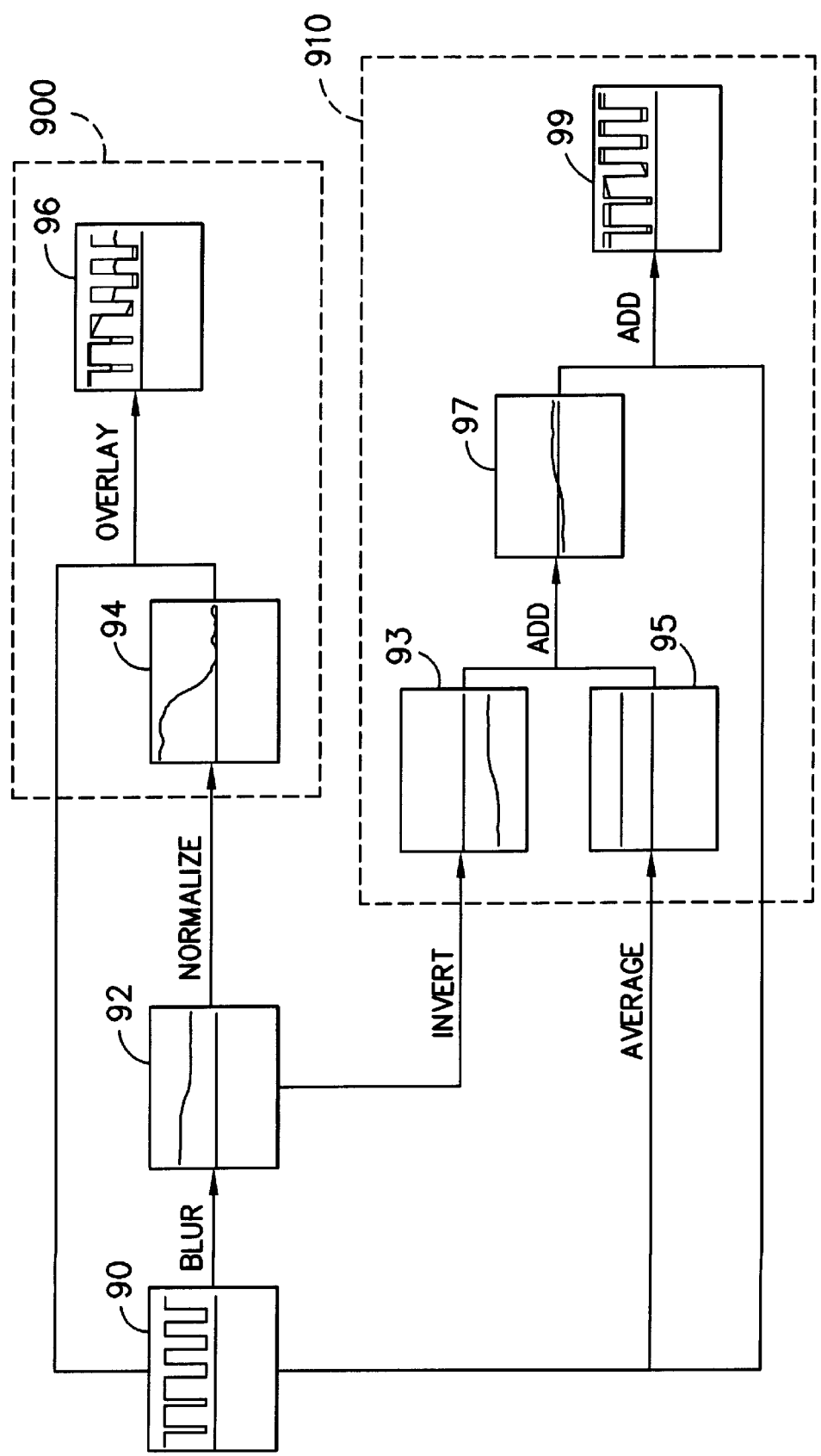
FIG. -9-

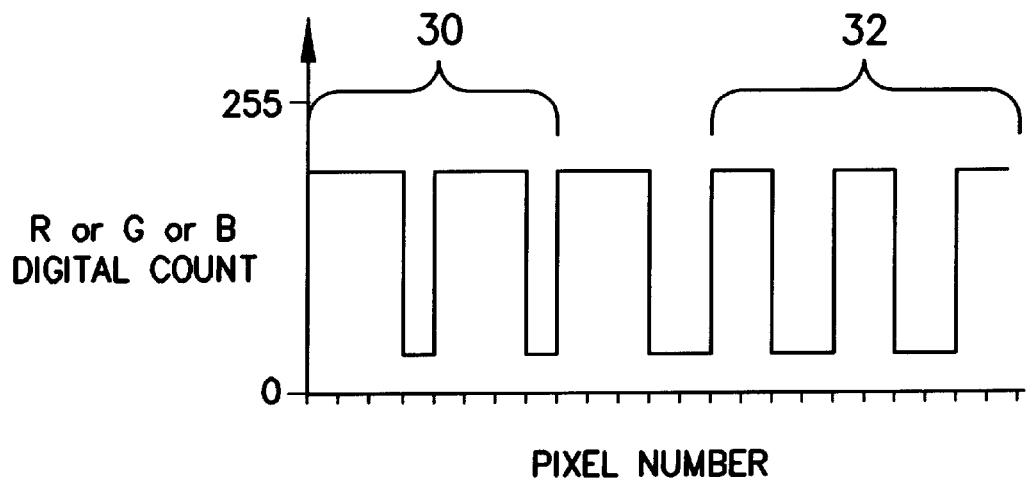
FIG. -10A-
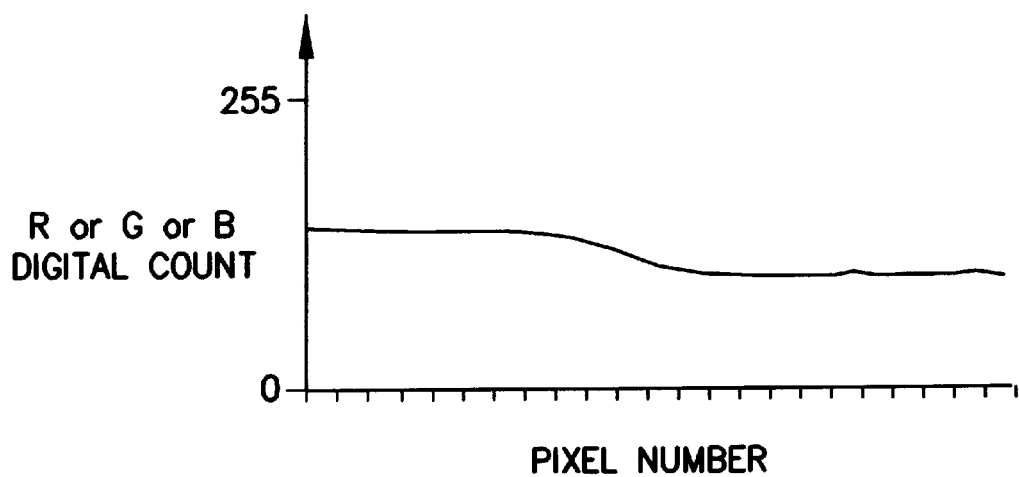
FIG. -10B-

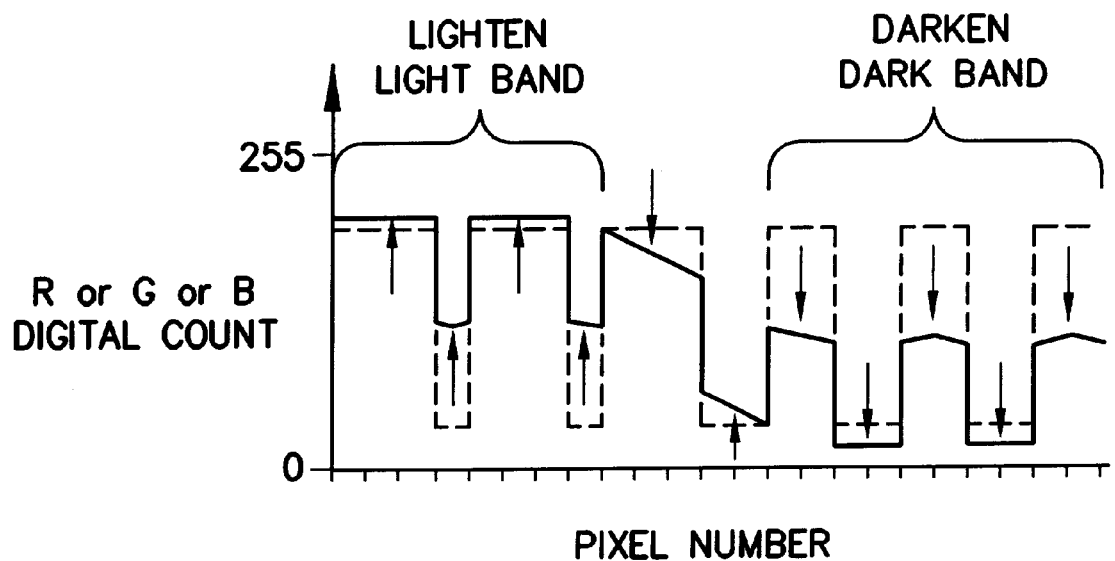
FIG. −10C−
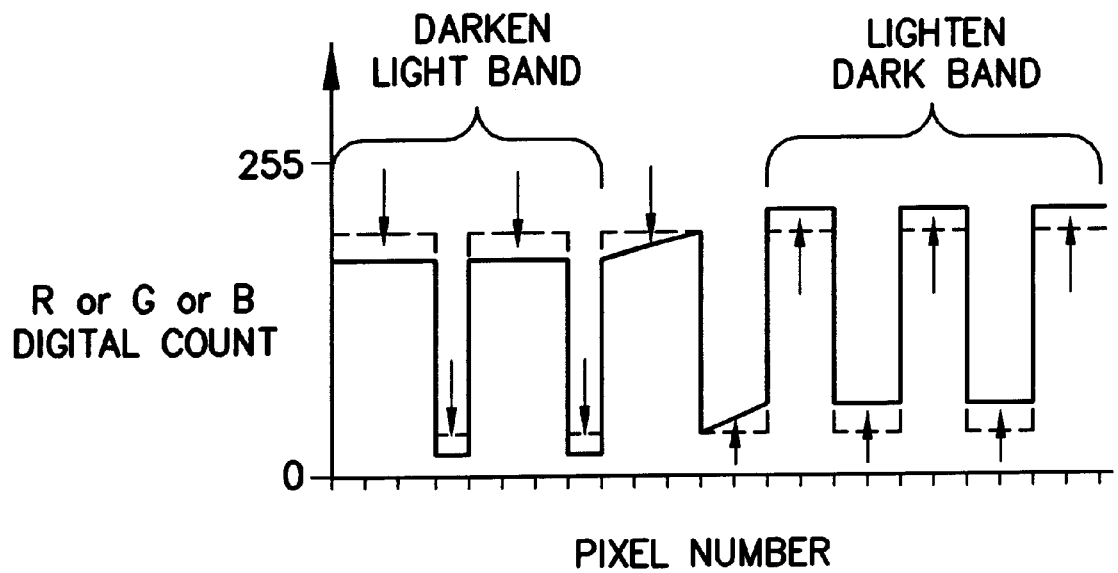
FIG. −10D−

PROCESSING OF PIXEL-BASED IMAGES FOR USE IN PATTERNED SUBSTRATES

BACKGROUND OF THE INVENTION

This invention relates to the processing of a pixel-based image for the purpose of predicting whether that image, when used as a repeat unit in a pattern and viewed over a large number of pattern repeats, will exhibit unintended and undesirable pattern artifacts. In another embodiment, this invention may be used to modify a pattern for the purpose of reducing or minimizing the visual perceptibility of such pattern artifacts.

More particularly, this invention relates to a method for analyzing a small portion of a repeating pattern—one containing at least one complete pattern repeat—and predicting whether concentrations of pattern elements or colors within that single pattern repeat collectively will form an undesirable large scale pattern when a large number of pattern repeats are viewed, particularly at a relatively shallow viewing angle. This invention is also useful in generating a modified pattern repeat in which such unintended pattern artifacts are made less visually obtrusive. Accordingly, the techniques disclosed herein can serve as a tool both to identify and correct such patterns, without the need for physically fabricating a patterned substrate having a large number of pattern repeats, making observations of the substrate at a relatively shallow viewing angle, and repeating the fabrication and observation process until a suitable substrate pattern is developed.

This method is particularly suited, but is not limited to, detecting such patterns and associated undesirable pattern artifacts in floor coverings that, in use, commonly are viewed at a relatively shallow sight angle that includes a relatively large number of pattern repeats. Although the description herein shall refer to carpet patterns, the technique is also applicable to patterns associated with drapery fabric, home or automotive upholstery, wall coverings, or any other patterned materials, objects, or media that are patterned using a relatively large number of pattern repeats or that are viewed at a relatively shallow sight angle, or both.

Designers of patterned substrates recognize the fact that patterns have both a small-scale and a large-scale character. A pattern that presents a visually acceptable image when viewed over one or a few pattern repeats can, if viewed over many pattern repeats, exhibit an objectionable large-scale pattern such as "banding" or "blobbing" (as those terms are defined hereinbelow) that is extremely difficult to detect or predict when only one or a few pattern repeats are observed. Furthermore, some patterns, when viewed at a relatively low sight angle (as naturally occurs with patterned floor coverings in large rooms), can exhibit additional or accentuated unintended patterning due to the ability of the eye to integrate visually otherwise unobtrusive patterning features along a shallow line of sight. This generally well-known phenomenon shall be referred to herein as visual integration. As used herein, the term "visually integrated pattern" or "large scale patterning artifact" shall be used interchangeably to describe the unintended pattern that is formed when several individually identical pattern repeats are viewed together, and that is best perceived when a large number of individual pattern repeats are viewed at one time and at a relatively shallow viewing angle, as, for example, a carpet pattern as viewed after the carpet is installed on the floor of a large room. As used herein, the term "component pattern" shall be used to describe the individual pattern elements or individual pattern repeats that, when replicated or tiled, form the overall patterned surface.

The terms "banding" and "blobbing" shall refer to a concentration of color or pattern elements, usually undesirable, that is most visually apparent when the pattern is viewed over multiple pattern repeats, at a shallow sight angle (thereby enhancing the visual integration effect), or both. In banding, the concentration takes the form of one or more visually perceptible bands or ribbons of color or shading that run through a series of pattern repeats and tend to distract the eye from the intended pattern; in blobbing, the concentration is in the form of one or more islands of color or pattern that appear to stand out from the background in a way that is not visually apparent when viewing one or a small number of pattern repeats in isolation, and that tend to detract from the intended patterning effect. The term "tile" or "tiled" shall be used in a mathematical sense, i.e., the placement of individual pattern repeats in abutting relationship so as to form a continuous, uninterrupted pattern, with common boundaries and no gaps between adjacent pattern repeats.

A major problem for carpet designers has been to determine, prior to undertaking the expense of manufacturing a sufficiently large sample of the patterned carpet and viewing that sample on the floor under various lighting conditions, which patterns are prone to large scale patterning artifacts such as banding or blobbing. As a secondary problem, designers frequently have had to use an educated trial-and-error approach to determine the best way to minimize or eliminate such artifacts once discovered. The cathode ray tube (CRT) video monitors that are commonly used by carpet designers in computer-aided design processes generally have inadequate resolution to allow the representation of a large enough number of pattern repeats, each with sufficient detail, to allow a meaningful visual evaluation of a given pattern. Additionally, such monitors are frequently subject to moire, "dot crawl" and other electronic artifacts associated with CRT imaging that make the fine detail frequently necessary to simulate such patterning artifacts difficult to image accurately. If fine pattern detail cannot be imaged accurately, then generating a sufficient number of pattern repeats necessary to see large scale patterning artifacts tends to distort or remove pattern information from the resulting image, and jeopardizes the ability to predict with confidence the presence of these artifacts.

The invention described herein presents a solution to this problem by allowing a computer-based designer of, for example, carpets, to (1) evaluate candidate carpet patterns and reliably identify those most likely to produce unintended large scale patterning artifacts, and (2) develop modifications to those patterns that reduce the indicated artifacts, and to do either without having to fabricate a large number of carpet samples and place them on a floor for evaluation. The techniques disclosed herein essentially exaggerate large scale patterning artifacts that tend to become more visually noticeable as the number of pattern repeats increases or the viewing angle decreases, or both, and can generate an "inverse" of the troublesome pattern areas that, when combined with the original pattern, can reduce or eliminate such artifacts.

SUMMARY OF THE INVENTION

In a preferred embodiment of this invention, a single repeat of a candidate pattern, described pixel-by-pixel in mathematical form within commercially available image processing software such as Adobe Photoshop (published by Adobe Systems, Incorporated, of San Jose, Calif.), is subjected to a first mathematical transform in which the color value of each pixel within a pre-defined region of the candidate pattern is changed to a color value that is a weighted average of the color values of all pixels in that region. The image comprised of pixels with these weighted average color values is then subjected to a second mathematical transform that generates a pixel-based image in which areas likely to produce unwanted large scale patterning artifacts are accentuated on the computer screen (or any print-out of that screen image). Alternatively, the result of the first mathematical transform may be subjected to a series of further mathematical operations that result in the generation of an alternative pattern, closely related to the original candidate pattern, in which the objectionable large scale patterning artifacts have been reduced or eliminated. It should be understood, however, that the techniques described herein are not limited to use in conjunction with commercial image processing software, but can easily be adapted for use with analog systems, optical systems, or other means.

For purposes of the following discussion, it will be assumed that the pattern to be analyzed is comprised of the three primary colors customarily used in electronic imaging, e.g., Red, Green, and Blue ("RGB"). However, the concepts disclosed herein may be appropriately and readily adapted by one of ordinary skill in the art to accommodate other primary color schemes (e.g., Cyan, Magenta, Yellow, Black), monochromatic patterns, half-tone images, or the like.

Each pixel comprising the pattern to be evaluated (which pattern may consist of a single pattern repeat or may consist of a small number of pattern repeats extending in each direction) is subjected to a first mathematical transformation process in which each of the three "primary" color values of that pixel (the "base pixel") is averaged with the corresponding color value of all other pixels within a pre-defined area surrounding the base pixel, in accordance with a pre-defined weighting function. The base pixel, also commonly referred to as the processed pixel, is that pixel over which the weighting function is centered.

The size and shape of the pre-defined area over which this averaging operation takes place (the "weighting function footprint") and the specific relationship between the color value of each surrounding pixel and its contribution to the resulting average (the weighting function value) depends upon the specific mathematical weighting function chosen. If the weighting function chosen is that of an axially symmetric Gaussian distribution, then the weighting function footprint will be a circle, and the weighting function will be described by a surface having cross sections that are Gaussian distributions extending in all directions to the edge of the footprint. It is understood that a Gaussian distribution has no abscissa values for which the ordinate value reaches zero. It has been found that arbitrarily limiting this distribution to, for example, ±2 sigma is adequate and, for computational efficiency, is preferred, although other values of sigma may be used.

Assuming a Gaussian distribution is used, the red value of the base pixel is averaged with the red values of each pixel within the circle, as weighted in accordance with the function values associated with the Gaussian distribution (appropriately truncated at the edges of the circle). The process is repeated in turn, using the same weighting scheme, for the green and blue color components of the base pixel. A pixel adjacent to the base pixel is then selected, it becomes the new base pixel, and the entire process is repeated.

After all pixels comprising the pattern have served as base pixels, all pixels comprising the image now have a composite color value that reflects the color of its neighbors, with close neighbors of a given pixel having a greater influence upon the composite value of that pixel, more distant neighbors having a lesser influence, and neighbors beyond the edge of the weighting function footprint having no influence on that pixel. The resulting image is a somewhat "homogenized" version of the original—the overall effect is that of an image that is severely out of focus, or blurred. The term "blur" shall be used herein to describe the result of this pixel-by-pixel weighted averaging operation. If the weighting function used is that of a Gaussian distribution, the resulting image may be referred to as a "Gaussian blur." This specific weighting function is particularly suited to this operation because it is closely associated with the physiology of vision and with focussing criteria in the design of optics, and happens to be available as a pre-programmed artistic effect-type function on some readily available image processing software such as Adobe Photoshop.

A characteristic of the blurred image is that areas of the pattern containing mostly dark colors are made lighter, and areas containing mostly light colors are made darker. This results in an overall localized averaging of the color levels in the pattern, which in turn results in a reduction in the level of contrast within the pattern. In order to compensate for this reduction in contrast, the blurred image preferably is subjected to a contrast-enhancing image processing step in which the average light and dark areas are "normalized," i.e., the contrast differences between the lightest and darkest areas of the pattern are artificially maximized, with all intermediate levels of contrast adjusted proportionally (e.g., by using linear interpolation).

To modify a troublesome pattern and thereby minimize large scale patterning artifacts, the above-described pattern diagnostic process can be modified to function as a pattern correction process. The blurred image technique that is an essential part of the pattern diagnostic process is used as the starting point for a series of mathematical transforms, the overall purpose of which is to darken areas that are predominantly light, and lighten areas that are predominantly dark. This is achieved through the calculation of "average" color values that are also calculated using a weighting function, but not necessarily the same one used to in the diagnostic portion of the process. As will be explained in greater detail below, the resulting "blurred" image is inverted. Separately, the original image is averaged in the sense that the arithmetic mean of all color values within the image are assigned to each pixel within the image, resulting in an "average" image having no contrast and having color values that are uniform. The inverted image and the average image are then combined, and that combination is combined with the original image. The result is a pattern in which the unwanted large scale patterning artifacts have been reduced or eliminated.

The above discussion is a summary of certain advantages of the instant invention. Other advantages will be apparent to those skilled in the art from the detailed description of the invention that follows, which description includes exemplary embodiments, as well as exemplary drawings as briefly described below.

BRIEF DESCRIPTION OF THE DRAWINGS

FIG. 1 is a simple geometric figure (based upon a "Greek Spiral") which represents a single pattern repeat of a pattern to be placed on a floor covering. The "stair step" edges of the pattern elements depict individual pattern pixels.

FIG. 2 represents a 5×5 array comprised of 25 repeats of the pattern of FIG. 1. Large scale patterning artifacts such as banding and blobbing, as defined herein, are not generally apparent.

FIG. 3 depicts a carpet having a pattern comprised of multiple repeats of the pattern of FIG. 1, as that carpet would appear when placed on a floor and observed at a relatively low viewing angle. Dark, vertically-oriented banding, as defined herein, is apparent.

FIG. 4 depicts a carpet with the pattern of FIG. 3, with the pattern repeat rotated 90° with respect to the pattern repeat shown in FIG. 3. The dark, vertically-oriented banding apparent in FIG. 3 is now manifested as dark, horizontally-oriented banding, and relatively subtle dark, horizontally-oriented banding in FIG. 3 is now more readily apparent as dark, vertically-oriented banding.

FIG. 5 depicts a Gaussian weighting function superimposed upon an array of pixels representing a simple pattern (a portion of the pattern of FIG. 1), a conceptual step in constructing the Gaussian blur described herein.

FIG. 6 depicts the 5×5 array of FIG. 2 following application of a Gaussian weighting function similar to that of FIG. 5, in accordance with the teachings of this invention.

FIG. 7 represents the 5×5 array of FIG. 6 following a normalizing step to increase the apparent contrast within the pattern, in accordance with the teachings of this invention. Both light and dark banding is evident. Mild blobbing, as defined herein, is now also observable.

FIG. 8 represents the processed image of FIG. 7 when attenuated and superimposed on the pattern of FIG. 2; the regions of dark banding along two orthogonal axes, and mild light blobbing in a rectilinear pattern at each corner of the Greek spiral, are readily apparent.

FIG. 9 summarizes in graphical form the image processing steps comprising the invention, indicating both the diagnostic and corrective portions of the process, beginning with a hypothetical pattern expressed in graphical form (color level vs. pixel location along a cross-section of the hypothetical pattern).

FIGS. 10A through 10D are graphs representing a cross-section of a portion of a hypothetical pattern, indicating the RGB digital count (a measure of each respective color's intensity for that pixel) as the pattern is processed in accordance with the teachings herein, and as indicated at various process steps in FIG. 9. In accordance with convention, the lower the digital count, the lower the relative color intensity.

DESCRIPTION OF PREFERRED EMBODIMENTS

FIGS. 1 and 2 depicts a relatively simple floor covering pattern that, when tiled or otherwise arranged in a repeating fashion, may be found in a number of designs in textiles and other media and in a variety of applications. While this pattern shall be used to demonstrate the invention herein, it should be understood that the invention is by no means limited to geometric patterns or patterns of any other specific category, or limited to floor coverings. Rather, this process is one by which any pattern, defined in terms of a pattern repeat unit which is tiled or otherwise replicated to form an overall patterned surface, (1) can be evaluated to determine if large scale patterning artifacts are likely to be visually obtrusive, and (2) can be modified to reduce the visual impact of such artifacts. Each of these processes will be discussed in turn.

It is not readily apparent that the pattern of FIGS. 1 and 2 would exhibit noticeable large scale patterning artifacts. However, as illustrated in FIGS. 3 and 4, which depict a "front" and "side" view of a large expanse of the pattern of FIG. 2 as seen from a relatively shallow viewing angle, such artifacts are clearly present. In FIG. 3, it is apparent that the design has a large scale character that includes noticeable top-to-bottom banding, as indicated generally at 10, 12. This banding is also apparent in the "side" view of this same pattern, shown in FIG. 4, in which it appears as side-to-side banding, indicated generally at 10', 12'. Perhaps more noticeable in FIG. 4 is the top-to-bottom banding, indicated generally at 14, 16, that was present, but not so visually obtrusive, in the FIG. 3 view.

To predict such large scale pattern character in advance while the design is still in the development stage, in accordance with a preferred embodiment of this invention, a computer-recognizable electronic image of the design, in which the design is defined by an array of pixels, is generated. In many cases, the design has been created by a computer, and the electronic, pixel-based image already exists. In other cases, a suitable electronic image may be generated by use of a scanner and appropriate computer software, or by other appropriate means. A full pattern repeat must be represented. Any areas surrounding the single pattern repeat are necessary merely to avoid any anomalies that might otherwise occur in the process steps due to the presence of an edge beyond which pixel color values would be undefined. Accordingly, for the processes disclosed herein, it shall be assumed that the pattern extends in all directions to the extent necessary to avoid such effects, a condition that easily can be simulated using a replication of the pattern repeat positioned along the edges of the pattern repeat, or by other means well known to graphic artists or computer-based designers. Although this inventive technique requires only a single pattern repeat, a small number of complete pattern repeats may also be used, if desired.

The next step is to determine the appropriate weighting function to be used in constructing the "blur" image. In most cases, a Gaussian (e.g., a "bell curve") distribution, as graphically depicted in FIG. 5, can be used with good results. As discussed above, it is believed this specific weighting function is particularly suited to this operation because it is closely associated with the physiology of vision and with focussing criteria in the design of optics, and happens to be available on some readily available image processing software such as Adobe Photoshop, Release 4.0, where it is most commonly used to generate aesthetically pleasing "soft focus" effects.

Looking at FIG. 5, an axially symmetric Gaussian weighting function is indicated at 20. This weighting function, when superimposed on a portion of the pattern, forms a circular "footprint" 22 on the pattern that is centered on a base pixel 24 (having coordinates (i, j) indicating pattern row and column, respectively) to be processed. This circular footprint area is that area beyond which the chosen weighting function has a zero or negligible value; in mathematical terms, this footprint defines the domain of the coordinates i' and j' by which the pixels within the footprint are indexed for computational purposes. In the case of a non-axially symmetric weighting function, the footprint would be non-circular. All pixels within the pattern shall be assumed to be comprised of a red component, a green component, and a blue component, each having an individual color value (which may range from 0 to 255). Other color coordinate systems may be used as appropriate. It is assumed, but not required, that the same weighting function be used for each color component.

Mathematically, if the locations of pixels within the footprint can be defined in terms of coordinates i' and j', and if i and j indicate the coordinates of the base pixel within the footprint, then the weighting function for an axially symmetric Gaussian distribution can be defined as $$w_{i,j,i',j'} = e^{-\{[(i-i')^2 + (j-j')^2]/2\sigma^2\}}$$

where the value of σ (the standard deviation of the distribution) determines the steepness or degree of localization of the distribution, and, accordingly, the relative shape and area of the distribution footprint.

The resulting value for the Red color components in the blur image (at pixel location i, j) is:

$$R_{i,j,blur} = \frac{\sum_{i',j'} w_{i,j,i',j'} \cdot R_{i',j'}}{\sum_{i',j'} w_{i,j,i',j'}}$$

A similar calculation is necessary to define the Green and Blue color components.

As depicted in FIG. 5, the relatively large weight associated with pixels immediately surrounding the base pixel means that the color component of these pixels will contribute much to the averaged, "blurred" value of the base pixel, while the corresponding contribution for pixels near the perimeter of the weighting function footprint will be almost negligible. This averaging process includes each pixel lying within the weighting function footprint, and is undertaken separately for each component color found in the base pixel.

In most cases, the weighting function for each component color will be the same for a given pixel location, but circumstances may dictate use of different weighting functions for each component color. When completed, a different, adjacent base pixel is selected, and the entire process is repeated. After all pixels within the pattern area have served as base pixels, the result is a "blurred" image of the pattern. This blurring transform has the effect of reducing the contrast of the initial pattern by reducing the range of possible color values in the pattern—pixels that originally had digital count values close to the maximum 255 have count values that are significantly reduced, and areas that had count values near zero have count values that are significantly increased. The resulting Gaussian blur for the pattern of FIG. 2 is depicted in FIG. 6 (in which the single pattern repeat has been expanded to a 5×5 array).

The size and shape of both the weighting function and the shape of the weighting function footprint depends upon the choice of weighting function, which, in turn, depends upon the specific circumstances. An axially symmetric Gaussian weighting function, because of its close relationship with the way images are seen by the human eye, is a preferred weighting function for most patterns, with a standard deviation value chosen so that the resulting footprint is a circle having a diameter that is appropriate to the scale of the design elements within the pattern repeat. In most cases, this will result in a value within the range of about 0.1 inch or less to about 10 inches or more, and most frequently in the area of textile pattern design, within the range of about 0.2 to about 2 inches. The best value within this range depends primarily upon the size of the overall pattern repeat and the relative size of the pattern elements making up the pattern repeat, with smaller or more complex patterns tending to require smaller standard deviation values.

It is foreseen that the use of a non-axially symmetric footprint, resulting from the use of "compound" Gaussian weighting curves (i.e., a Gaussian surface with different standard deviation values in different directions) or the use of weighting surfaces that are spherical, parabolic, pyramidal (i.e., having triangular cross sections), or some other shape, might be useful under certain conditions. For example, if the pattern will only be observed within a narrow range of lateral angles, for example, a carpet installed in a long, narrow hallway, a weighting function that results in an elongate or elliptical footprint, perhaps oriented along the length of the hall, might be advantageous. Furthermore, it is foreseen that, in special circumstances, individual weighting functions for each color component may be advantageous. As one example, given only for illustrative purposes, an axially symmetric Gaussian function may be used for one color component, an axially asymmetric Gaussian function may be used for another color component, and a weighting function having a cross-section that is non-Gaussian (e.g., spherical, elliptical, triangular, rectangular, histogram-like, or other shape) may be used for yet another color component. Any of the preceding three weighting function options, or other options, may be used exclusively or in combination.

As an additional step, the resulting image may be enhanced by a "normalization" step, which will serve to compensate for the loss of contrast inherent in the blurring function. In the normalization step, all pixels in the blurred image are examined to determine the overall maximum and minimum intensity values for each of the component colors used in the blurring process, and those minimum and maximum values are exaggerated to reflect the absolute minimum and maximum values possible, with all intermediate values correspondingly adjusted in proportional fashion.

For example, assuming that the chosen component colors were red, blue, and green, the actual or original minimum value for each of those respective colors can be set to display at the theoretical minimum value possible (e.g., 0), and the actual or original maximum value can be set to display at the theoretical maximum value possible (e.g., 255). Pixels that, prior to normalization, contained an intermediate color value can be linearly interpolated within these new extreme values, in accordance with the following formula (for the Red color component):

$$R_{i,j,norm} = [R_{theo.max}(R_{i,j} - R_{act.min}) - R_{theo.min}(R_{i,j} - R_{act.max})]/[R_{act.max} - R_{act.min}]$$

where:
$R_{theo.max} = 255$, $R_{theo.min} = 0$,
$R_{act.max} = \text{MAX}\{R_{i,j,blur}\}$, and $R_{act.min} = \text{MIN}\{R_{i,j,blur}\}$
Similar calculations would be performed for the remaining color components.

This normalization process can be easily programmed, but happens to be offered as a pre-programmed function on many commercially available image processing software programs. For example, "Auto Level" on Adobe Photoshop, Release 4.0 performs a somewhat similar function (for the purpose of enhancing contrast and brightness in a photographic image). In the invention described herein, the normalization process is used to provide the monitor with an image in which potential large scale patterning artifacts are even further exaggerated and made even more visually prominent, and provide for the easy identification of large scale pattern artifacts of considerable subtlety. The result of normalization on the blurred pattern of FIG. 6 is shown in FIG. 7 (in which the single pattern repeat has been expanded to a 5×5 array to enhance the visibility of large scale patterning artifacts). The normalized blurred image indicates clearly that dark bands and moderate light blobbing can be expected from this pattern. It is foreseen that, to enhance the visibility of certain large scale artifacts, false color optionally may be introduced to provide additional contrast.

FIG. 8 is the superposition of the normalized blurred image of FIG. 7 (after being appropriately attenuated) and the original pattern of FIG. 2. In this configuration, the expected large scale pattern artifacts predicted by the blurring/normalization process remain obvious, and can be associated with specific areas of the overall pattern. This association can be used by the designer to suggest candidate pattern areas for modifying the pattern in ways that will reduce or eliminate the large scale pattern artifacts, using intuition and experience combined with trial-and-error.

To summarize the above diagnostic process, attention is directed to FIGS. 9 and 10, which shall be discussed together. FIG. 9 schematically depicts a preferred embodiment of this invention in the form of a series of image processing steps, each of which performs a mathematical operation on one line of a single pattern repeat. Step 90 begins with the digital representation shown in FIG. 10A. This representation of a small portion of a pattern (not necessarily that of FIG. 1) is a plot of pixel location along the horizontal axis vs. the digital count for a given primary color along the vertical axis. The digital count is a numeric value that is proportional to color intensity. In an RGB color system, the values for each of the three primary colors range from 255 (maximum color intensity) to 0 (minimum color intensity). FIG. 10A describes a "cross-section," one pixel in width and showing only a single component color, of a portion of a pattern in which a relatively broad lightly colored area, indicated at 30, is followed in turn by a relatively broad area of dark color, indicated at 32. This digital "signature" shall be the starting point 90 for the operations depicted in the remainder of FIG. 9.

Image processing step 92 depicts the result of a Gaussian blur operation, similar to that discussed hereinabove in connection with FIG. 5. As previously discussed, the purpose of this operation, using a Gaussian weighting function, is to simulate mathematically the pattern as it would appear at a distance to the human eye—small details can no longer be perceived, and color intensities tend to average. This effect is graphically represented in FIG. 10B, which shows the result of the use of a Gaussian weighting function on the pattern signature of FIG. 10A. Other weighting functions, unrelated to the Gaussian weighting function, may also be employed as pattern and viewing conditions dictate. As discussed above, the result of this image processing step, as applied to the pattern of FIG. 2, is shown in FIG. 6.

For diagnostic purposes, the output of image processing step 92 is forwarded to the image processing steps depicted inside dotted box 900, where the image is passed to image processing step 94 ("Normalize"). In this step, the actual minimum and maximum digital counts of the blurred image are "stretched" to correspond to the theoretical minimum and maximum digital counts (i.e., 0 and 255, respectively), with all intermediate counts, if any, in the blurred image interpolated accordingly. This operation is for the purpose of contrast enhancement, and tends to accentuate areas in which banding or blobbing are likely to occur. The result of this image processing step, as applied to the pattern of FIG. 2, is shown in FIG. 7. At this point, the pattern has been effectively screened and, if prone to large scale patterning artifacts, identified as problematic. As an optional final step of the diagnostic process, the normalized blurred image is combined with the original pattern, in overlay fashion and perhaps with some adjustment in relative image intensity, as needed.

The result is depicted graphically in image processing step 96 and is shown in more detail in FIG. 10C and, as applied to the pattern of FIG. 2, in FIG. 8. As can be seen, all colors within the light band 30 have been made lighter, and all colors within the dark band 32 have been made darker.

As referenced above, another embodiment of this invention can be used to mathematically construct a modified pattern that will reduce or eliminate large scale pattern artifacts found in patterns without the need to resort to trial-and-error, fabricate-and-evaluate procedures. Assuming that a large scale patterning artifact is found and deemed undesirable, the processes depicted within dotted box 910 of FIG. 9 can be used to generate a "corrected" pattern that will dramatically reduce the perceptibility of the artifact(s). Looking at FIG. 9, a blurred image of image processing step 92 is fed to step 93. It should be noted that, if a Gaussian distribution is used, the sigma size (or equivalent parameter, if a non-Gaussian distribution is used) used in the blur step may require adjustment for best results. Typically, sigma values of about half the value used in the diagnostic process have been found effective, but different patterns may require a different degree of adjustment.

Image processing step 93 forms an invert of the blurred image, i.e., all digital counts are made negative, thereby forming, below the depicted x axis, a "mirror image" of the blurred image. Image processing step 95 forms an average (mean) of all digital counts for a given component color contained in the original pattern repeat, a portion of which is depicted at 90. This step 95 results in the wholly positive, single-valued straight line representation shown. When the results of steps 93 and 95 are combined in step 97, the result is an inverse of the blurred image that has been offset by an amount equal to the average (mean) digital count contained in this portion of the image. This signature, as depicted in step 97, is likely to contain both positive and negative digital count values. If desired, this signature can be appropriately scaled to adjust the contrast in the resulting modified pattern repeat, a portion of which is depicted at 99. When this signature is then added to the original digital count signature from step 90, the result is as indicated at step 99, and shown in more detail in FIG. 10D. As can be seen, all colors within the light band 30 have been made darker, and all colors within the dark band 32 have been made lighter.

This invention includes, but is not necessarily limited to, embodiments having one or more of the foregoing features. Having described the principles of this invention in the form of the foregoing exemplary embodiments, it should be understood to those skilled in the art that the invention can be modified in arrangement and detail (for example, the sequence in which certain steps or operations are performed may be re-arranged) without departing from such principles, and that all such modifications falling within the spirit and scope of the following claims are intended to be protected hereunder.

We claim:

1. A method for processing a pattern suitable for use on a textile substrate, said pattern being comprised of an array of pixels, each pixel having an individual color value, said method comprised of the following steps:

a. selecting a weighting function to be used in determining an average color value for a selected pixel in said pattern, said weighting function specifying the relative contributions of neighboring pixels in determining said average color;

b. selecting a base pixel;

c. determining an average color value for said base pixel, said average color value being a weighted average of the color value of said base pixel and the weighted color values of all pixels surrounding said base pixel within the domain of said weighting function;

d. selecting a different base pixel;

e. repeating steps c and d until all pixels within said pattern have been selected;

f. determining the individual pixels having the minimum and maximum color values, respectively;

g. assigning theoretical minimum and maximum color values to said individual pixels, respectively, and assigning new color values to all other pixels within said pattern corresponding to values interpolated from said theoretical minimum and maximum color values, thereby defining a new pixel set;

h. generating an image using the pixel set of step g.

2. The method of claim 1 wherein said pixels are defined in terms of a plurality of individual component colors and corresponding component color values, and wherein steps a through g are repeated for each such component color.

3. The method of claim 1 wherein said pixels are defined in terms of a plurality of individual component colors and corresponding component color values, and wherein steps b through g are repeated for each such component color, thereby providing the same weighting function for each component color.

4. The method of claim 1 wherein said weighting function used in determining an average color value for said base pixel assigns a relative contribution to said average that is higher for pixels that are relatively close to said base pixel and lower for pixels that are relatively distant from said base pixel.

5. The method of claim 1 wherein said weighting function is axially symmetric.

6. The method of claim 1 wherein said weighting function has a cross-section that is a Gaussian distribution.

7. The method of claim 2 wherein at least one of said weighting functions is axially symmetric.

8. The method of claim 2 wherein said axially symmetric weighting function has a cross-section that is a Gaussian distribution.

9. The method of claim 1 wherein the resulting image is superimposed over an unprocessed image of said pattern.

10. A method for processing a pattern suitable for use on a textile substrate, said pattern being comprised of an array of pixels, each pixel having a individual color value prior to processing, said method comprised of the following steps:

a. selecting a weighting function to be used in determining an average color value for a selected pixel in said pattern, said weighting function specifying the relative contributions of neighboring pixels in determining said average color;

b. selecting a base pixel;

c. determining an average color value for said base pixel, said average color value being a weighted average of the color value of said base pixel and the weighted color values of all pixels surrounding said base pixel within the domain of said weighting function;

d. selecting a different base pixel;

e. repeating steps c and d until all pixels within said pattern have been selected;

f. invert each of the average color values generated in step e;

g. determine a non-weighted average color value for all pixels comprising said pattern, and assign that value to all pixels within said pattern;

h. for each pixel within said pattern, add the inverted color value of step f and the average color value of step g to obtain a correction color value;

i. for each pixel within said pattern, add the correction color value of step h to the color value of that pixel prior to processing.

11. The method of claim 10 wherein each of said pixels is defined in terms of a plurality of individual color values, and wherein steps a through i are repeated for each such component color value.

12. The method of claim 10 wherein said pixels are defined in terms of a plurality of individual component colors and corresponding component color values, and wherein steps b through i are repeated for each such component color, thereby providing the same weighting function for each component color.

13. The method of claim 10 wherein said weighting function used in determining an average color value for said base pixel assigns a relative contribution to said average that is higher for pixels that are relatively close to said base pixel and lower for pixels that are relatively distant from said base pixel.

14. The method of claim 10 wherein said weighting function is axially symmetric.

15. The method of claim 10 wherein said weighting function has a cross-section that is a Gaussian distribution.

16. The method of claim 11 wherein at least one of said weighting functions is axially symmetric.

17. The method of claim 11 wherein said axially symmetric weighting function has a cross-section that is a Gaussian distribution.

* * * * *

UNITED STATES PATENT AND TRADEMARK OFFICE
CERTIFICATE OF CORRECTION

PATENT NO.   : 6,181,816 B1
DATED        : January 30, 2001
INVENTOR(S)  : Louis William Adams, Jr. et al.

It is certified that error appears in the above-identified patent and that said Letters Patent is hereby corrected as shown below:

Drawings,
Delete Figs. 6, 7, & 8 and substitute Figs. 6, 7, & 8 shown on the attached pages.

Signed and Sealed this

Third Day of June, 2003

JAMES E. ROGAN
*Director of the United States Patent and Trademark Office*

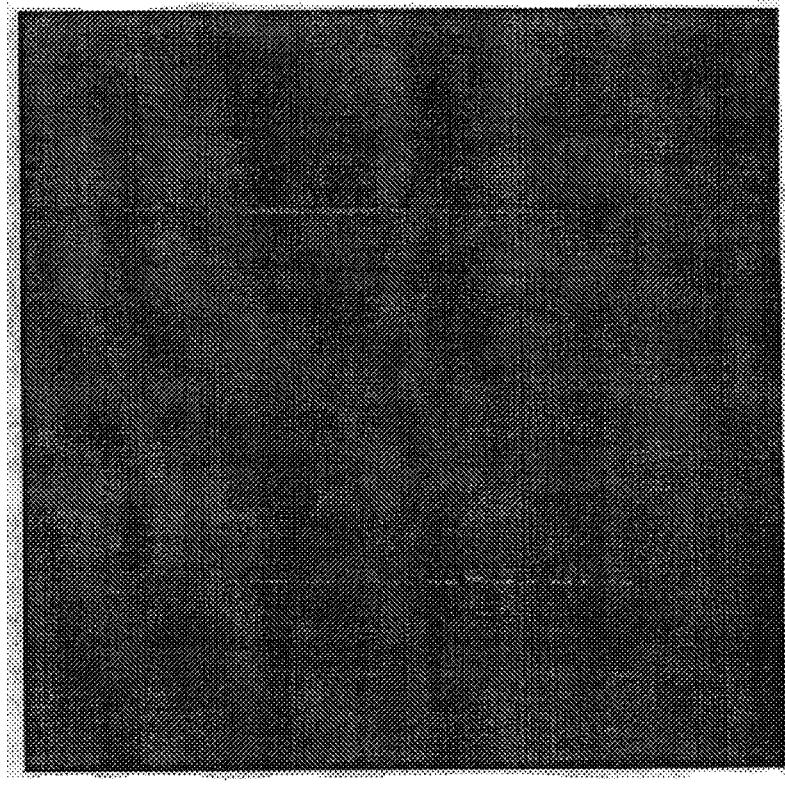
FIG. -6-

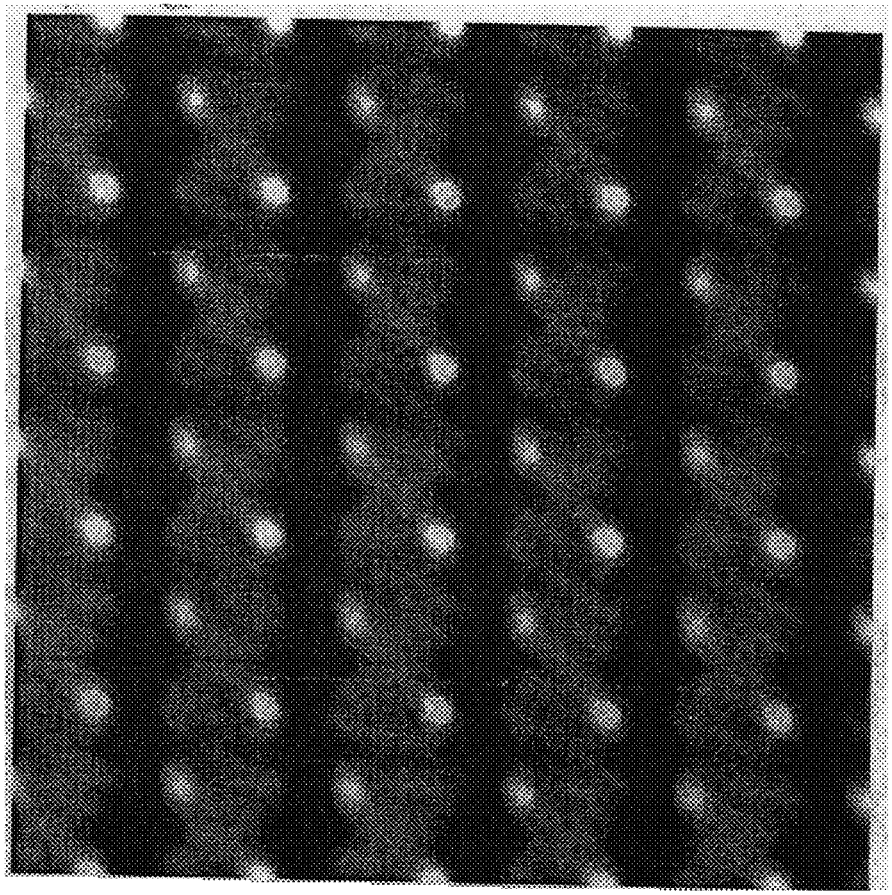
FIG. -7-

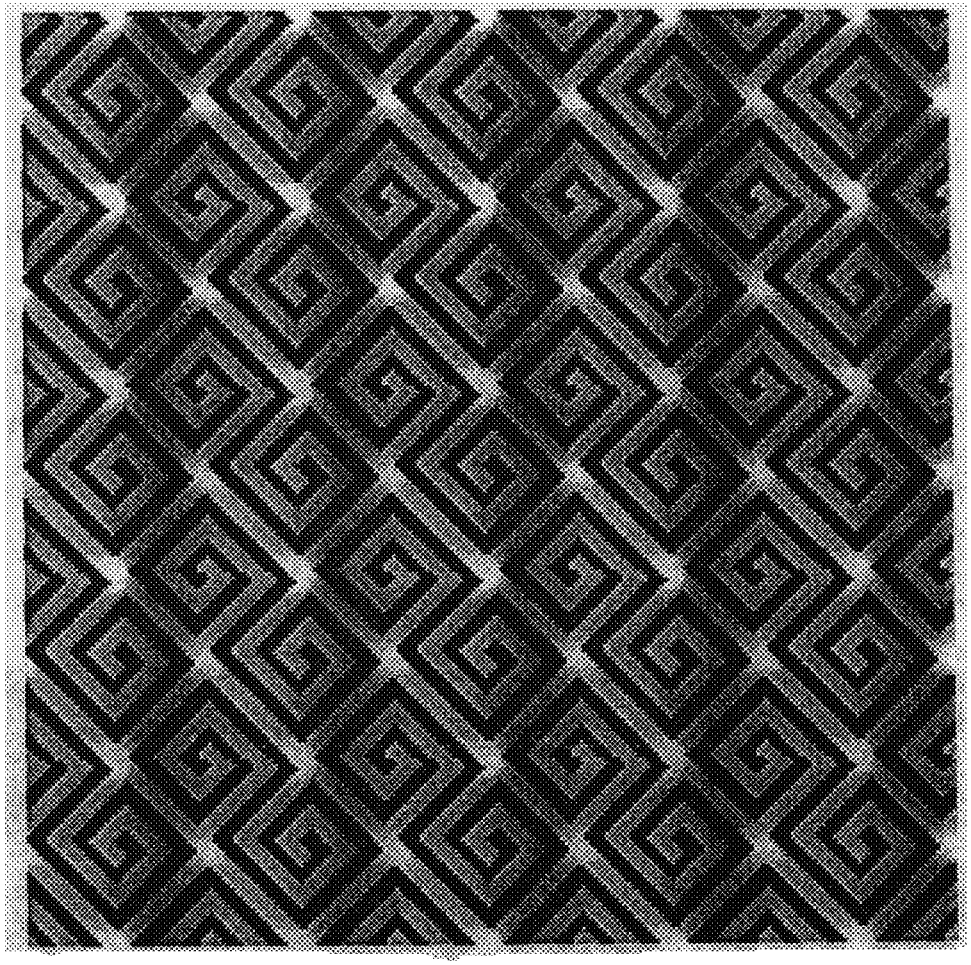
FIG. -8-